(12) United States Patent
Baxter et al.

(10) Patent No.: US 10,537,828 B2
(45) Date of Patent: Jan. 21, 2020

(54) METHOD FOR PREVENTING FOULING OF A DEMISTER

(71) Applicants: Larry Baxter, Orem, UT (US); Andrew Baxter, Spanish Fork, UT (US); Kyler Stitt, Lindon, UT (US); Aaron Sayre, Spanish Fork, UT (US); Stephanie Burt, Provo, UT (US); David Frankman, Provo, UT (US); Nathan Davis, Bountiful, UT (US)

(72) Inventors: Larry Baxter, Orem, UT (US); Andrew Baxter, Spanish Fork, UT (US); Kyler Stitt, Lindon, UT (US); Aaron Sayre, Spanish Fork, UT (US); Stephanie Burt, Provo, UT (US); David Frankman, Provo, UT (US); Nathan Davis, Bountiful, UT (US)

(73) Assignee: Sustainable Energy Solutions, LLC, Orem, UT (US)

(*) Notice: Subject to any disclaimer, the term of this patent is extended or adjusted under 35 U.S.C. 154(b) by 275 days.

(21) Appl. No.: 15/485,569

(22) Filed: Apr. 12, 2017

(65) Prior Publication Data

US 2018/0299194 A1   Oct. 18, 2018

(51) Int. Cl.
*B01D 53/14* (2006.01)
*B01D 45/08* (2006.01)
*B01D 5/00* (2006.01)
*F25J 3/02* (2006.01)
*B01D 1/30* (2006.01)

(52) U.S. Cl.
CPC ............... *B01D 5/00* (2013.01); *B01D 1/305* (2013.01); *B01D 5/003* (2013.01)

(58) Field of Classification Search
CPC ........... B01D 1/305; B01D 5/00; B01D 5/003
See application file for complete search history.

(56) References Cited

U.S. PATENT DOCUMENTS 4,976,210 A * 12/1990 Dewald .................... F23G 5/12
110/215

* cited by examiner

*Primary Examiner* — Cabrena Holecek (57) ABSTRACT

A method for preventing fouling of a demister is disclosed. A process fluid is provided into a vessel. A gas is provided to a gas inlet of the vessel. The gas comprises a component that desublimates, crystallizes, solidifies, reacts, or a combination thereof, in the process fluid, forming a first solid. The gas is passed through the process fluid, the component of the gas forming the first solid, resulting in a component-depleted gas. The component-depleted gas is passed out of the process fluid, causing splashing or spurting of the process fluid and the first solid. The diverter section is provided between the demister and the gas inlet, the diverter section comprising a physical obstruction preventing the process fluid and the first solid from splashing or spurting onto the demister. In this manner, fouling of the demister is prevented.

20 Claims, 10 Drawing Sheets

METHOD FOR PREVENTING FOULING OF A DEMISTER

This invention was made with government support under DE-FE0028697 awarded by The Department of Energy. The government has certain rights in the invention.

BACKGROUND

Field of the Invention

This invention relates generally to the field of splash mitigation. More particularly, we are interested in preventing fouling of a demister by splashing of bubbles.

Related Technology

The art of preventing bubbles of material from going to unwanted locations in a system is utilized in industries from bottling beverages to glass blowing. Demisters are not especially sensitive to splashing liquids. However, when stripping a component from a gas into a liquid, and the component forms a solid, splashing can cause the solids formed to freeze onto a demister, fouling it, produce stalactites that fall and cause blockage in the liquid systems, or change chemical concentrations, causing disruptions in production. A method for preventing fouling of demisters in this manner is required.

United States patent publication number 20110074894, to Sabo, et al., teaches a device for reducing ink droplets generated by bursting bubbles in an ink developer. The apparatus utilizes a splash guard to direct ink splashed from bubbles burst by a roller back into the ink tray, rather than onto side walls of the apparatus. The present disclosure differs from this disclosure in that there are no solids present in the ink, there are no components in the bubbles that may become solids in the apparatus, and the splash guard is not used to prevent fouling of a demister. This disclosure is pertinent and may benefit from the methods and devices disclosed herein and is hereby incorporated for reference in its entirety for all that it teaches.

U.S. Pat. No. 5,868,814, to Lin, teaches an apparatus for recirculating molten glass. The apparatus utilizes a splash guard to prevent bubbled molten glass from splashing into the area above the outlet of the molten glass opening, around the air pipe. The present disclosure differs from this disclosure in that there are no solids present in the molten glass, there are no components in the air that may become solids in the apparatus, and the splash guard is not used to prevent fouling of a demister. This disclosure is pertinent and may benefit from the methods and devices disclosed herein and is hereby incorporated for reference in its entirety for all that it teaches.

United States patent publication number 20130020232, to Turner, et al., teaches a molten salt rolling bubble column reactor. The apparatus utilizes a splash guard to prevent molten salt from being splashed by steam from the salt bath onto upper surfaces of a crucible that are not as warm. The salts could then solidify, blocking gas flows. The present disclosure differs from this disclosure in that there are no components in the steam that may become solids in the apparatus, the splash guard is not used to prevent fouling of a demister, and the splash guard disclosed would become blocked if it was not kept at high temperatures. This disclosure is pertinent and may benefit from the methods and devices disclosed herein and is hereby incorporated for reference in its entirety for all that it teaches.

U.S. Pat. No. 3,826,718, to Takayasu, teaches an apparatus for automatically effecting vacuum concentration and recovery of waste liquid. An evaporating vessel is used to recover waste liquid using vacuum concentration. A splash guard is used to prevent steam induced bubbles from rising up the vessel. The present disclosure differs from this disclosure in that there are no components in the steam that may become solids in the apparatus, the splash guard is not used to prevent fouling of a demister, and the liquid is removed from the evaporation vessel as a gas, rather than a portion of the gas, in this case steam, being removed with the liquid. This disclosure is pertinent and may benefit from the methods and devices disclosed herein and is hereby incorporated for reference in its entirety for all that it teaches.

U.S. Pat. No. 8,162,296, to Birtcher, et al., teaches a splashguard for a high flow vacuum bubbler vessel. The apparatus generates vapor under high vacuum or high flowrates. The apparatus produces bubbles that would splash to form aerosol droplets in the outlet, resulting in uneven delivery rates of the vapor. The present disclosure differs from this disclosure in that the gas delivered by the bubbler has no components that may become solids in the apparatus, the splash guard is not used to prevent fouling of a demister, but rather acts as a demister rather than a splash guard, and the liquid is removed from the vessel as a vapor, rather than a portion of the gas being removed with the liquid. This disclosure is pertinent and may benefit from the methods and devices disclosed herein and is hereby incorporated for reference in its entirety for all that it teaches.

SUMMARY

A method for preventing fouling of a demister is disclosed. A vessel comprising the demister in an upper portion of the vessel, a gas inlet in a lower portion of the vessel, and a diverter section in a first middle portion of the vessel, is provided. A process fluid is provided into a second middle portion of the vessel. A gas is provided to the gas inlet. The gas comprises a component that desublimates, condenses, crystallizes, solidifies, reacts, or a combination thereof, in the process fluid, forming a first solid. The gas is passed through the gas inlet into the process fluid, the component of the gas forming the first solid, resulting in a component-depleted gas. The component-depleted gas is passed out of the process fluid, causing splashing or spurting of the process fluid and the first solid. The diverter section is provided between the demister and the gas inlet, the diverter section comprising a physical obstruction preventing the process fluid and the first solid from splashing or spurting onto the demister. In this manner, fouling of the demister is prevented.

The physical obstruction may allow the component-depleted gas to pass upwards and the process fluid to pass downwards. The physical obstruction may comprise a surface material inhibiting adsorption of gases, preventing deposition of solids, or a combination thereof. The physical obstruction may comprise one or more bars, rods, pipes, plates, angle iron, wires, tubes, hoses, spheroids, or combinations thereof. The one or more bars, rods, pipes, plates, angle iron, wires, tubes, hoses, spheroids, or combinations thereof may be arranged in one or more levels. The one or more bars, rods, pipes, plates, angle iron, wires, tubes, hoses, spheroids, or combinations thereof may be arranged in a pattern that blocks any linear path between a surface of the process fluid and a surface of the demister.

A heat exchange fluid may be provided to the pipes to melt a portion of the first solid that impinges upon the pipes, causing the first solid to slide off the pipes into the process fluid. The pipes may be provided at an acute angle below horizontal.

The physical obstruction may comprise an offset section of the vessel, wherein a middle portion of the vessel jogs to a side, causing the upper portion of the vessel to not be above the process fluid.

The vessel may comprise a direct-contact heat exchanger, direct-contact material exchanger, spray tower, reactor, combustor, distillation column, flash vessel, or tank.

The gas inlet may comprise a bubble plate, bubble tray, nozzle, sparger, or combinations thereof. The gas inlet may comprise a surface material inhibiting adsorption of gases, preventing deposition of solids, or a combination thereof.

The demister may comprise a knitted-mesh demister, a vane-type demister, a demisting cyclone, a coalescer, a fiber-bed mist eliminator, or combinations thereof.

The gas may comprise flue gas, syngas, producer gas, natural gas, steam reforming gas, any hydrocarbon that has a lower freezing point than the temperature of the process fluid, light gases, refinery off-gases, or combinations thereof. The component may comprise carbon dioxide, nitrogen oxide, sulfur dioxide, nitrogen dioxide, sulfur trioxide, hydrogen sulfide, hydrogen cyanide, water, mercury, hydrocarbons with a freezing point above a temperature of the process fluid, or combinations thereof.

The process fluid may comprise a cryogenic liquid. The cryogenic liquid may comprise any compound or mixture of compounds with a freezing point above a temperature at which the first solid forms from the gas. The cryogenic liquid may comprise 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

The process fluid may comprise a second solid. The second solid may comprise particulates, mercury, other heavy metals, condensed organics, soot, inorganic ash components, biomass, salts, water ice, frozen condensable gases, frozen absorbed gases, impurities common to vitiated flows, impurities common to producer gases, impurities common to other industrial flows, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
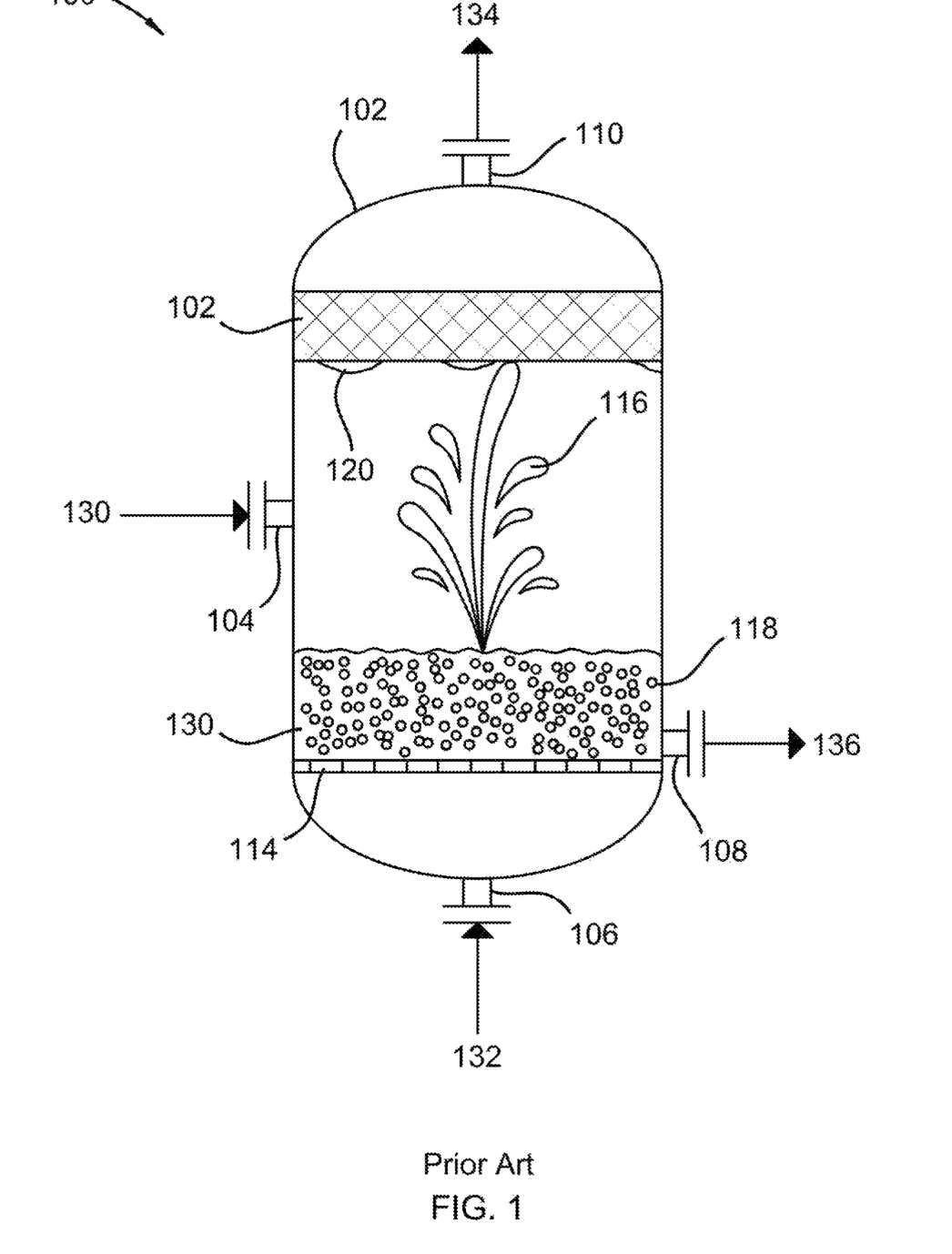
FIG. 1 shows Prior Art of a vessel for bubbling a gas through a liquid in a vessel with a demister.

Referring to FIG. 1, Prior Art of a vessel for bubbling a gas through a liquid in a vessel with a demister is shown at 100. Vessel 102 comprises liquid inlet 104, gas inlet 106, liquid outlet 108, gas outlet 110, demister 112, and bubble plate 114. Process fluid 130 is provided to liquid inlet 104 and gas 132 passes through bubble plate 114 and through process fluid 130. Gas 132 is cooled and a component is desublimated from the gas to form solid 118, leaving component-depleted gas 134, which passes through process fluid 130, through demister 112, and out gas outlet 110. However, component-depleted gas 134 leaving process fluid 130 causes splashing and spurting 116 of process fluid 130 and solid 118. Solid 118 impinges on demister 112, leading to deposits 120. Deposits 120 reduces the surface area of the demister, even blocking it entirely, requiring a shut down for cleaning.

Figure 2:
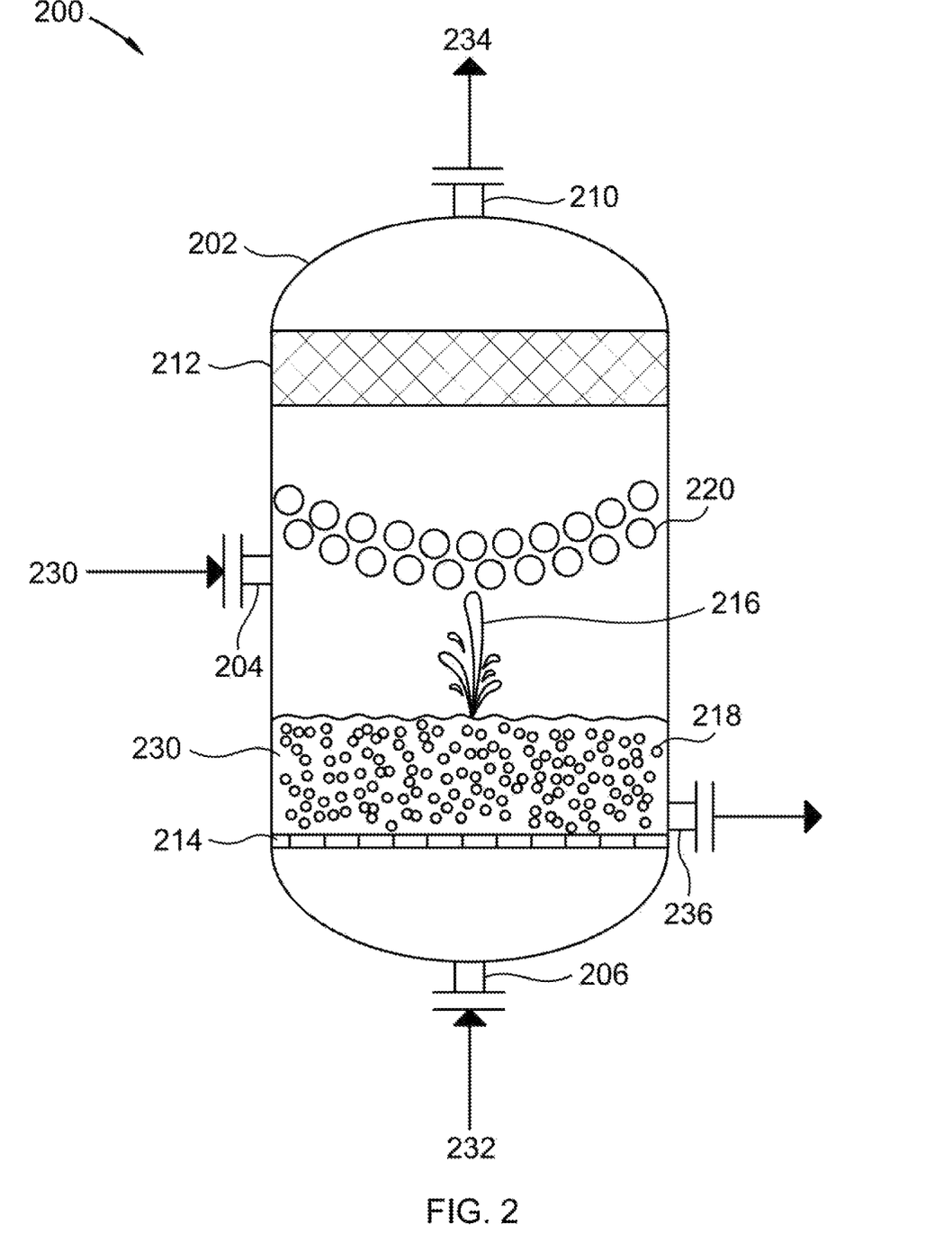
FIG. 2 shows a cross-section of a vessel for bubbling a gas through a liquid without fouling of a demister.

Referring to FIG. 2, a cross-section of a vessel for bubbling a gas through a liquid without fouling of a demister is shown at 200, as per one embodiment of the present invention. Vessel 202 comprises liquid inlet 204, gas inlet 206, liquid outlet 208, gas outlet 210, demister 212, bubble plate 214, and diverter pipes 220. Process fluid 230 is provided to liquid inlet 204 and gas 232 passes through bubble plate 214 and through process fluid 230. Gas 232 is cooled and a component is desublimated, condensed, crystallized, solidified, reacted, or a combination thereof from the gas to form solid 218, leaving component-depleted gas 234, which passes through process fluid 230, diverter pipes 220, demister 212, and out gas outlet 210. Component-depleted gas 234 leaving process fluid 230 causes splashing and spurting 216 of process fluid 230 and solid 218. Diverter pipes 220 block splashing and spurting 216 of process fluid 330 from causing solid 218 to impinge upon demister 212, keeping demister 212 from fouling.

Figure 3A:
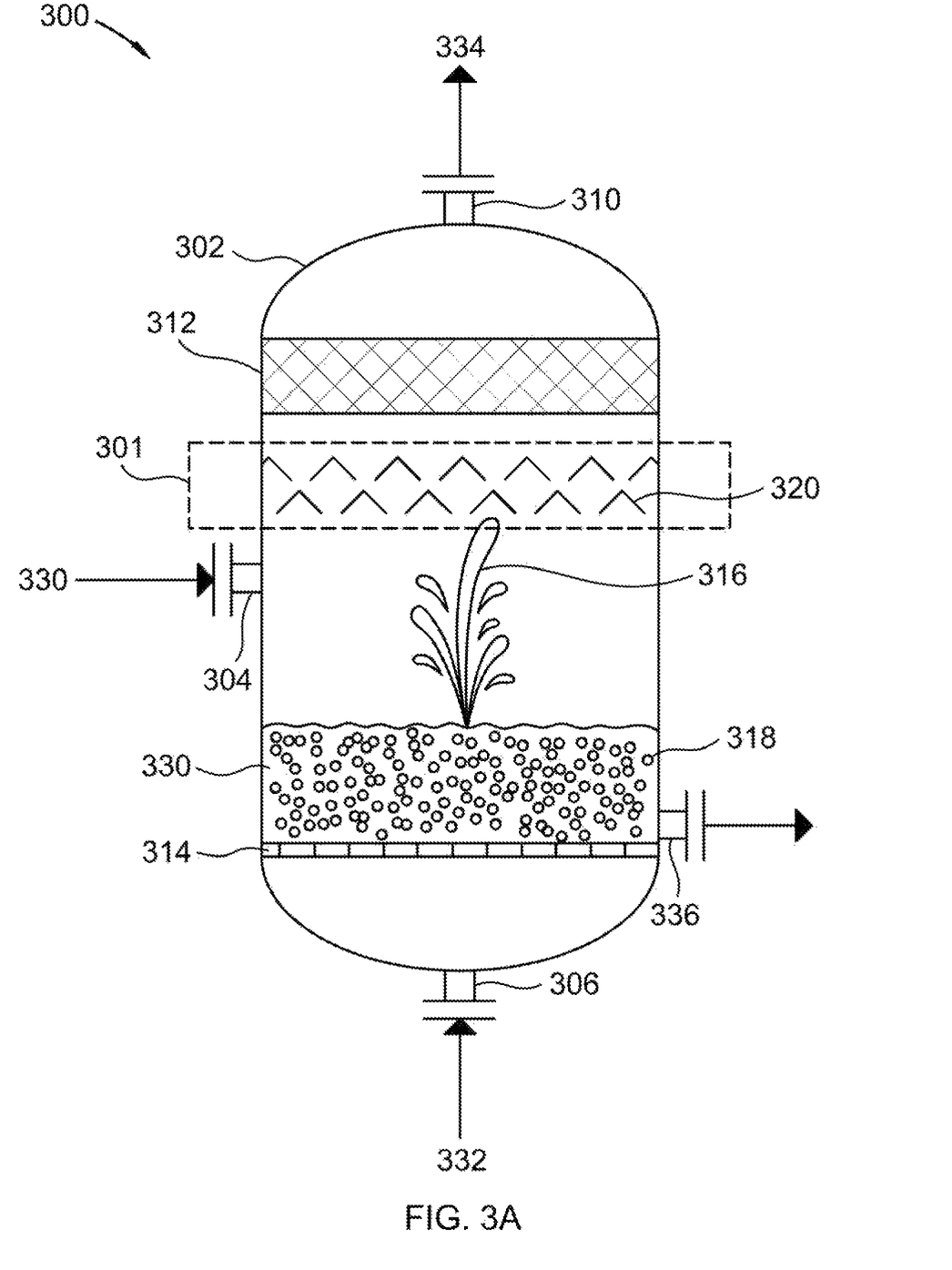
FIGS. 3A-B show a cross-section of a vessel for bubbling a gas through a liquid without fouling of a demister and an isometric cutaway view of the diverter portion of the vessel.
Figure 3B:
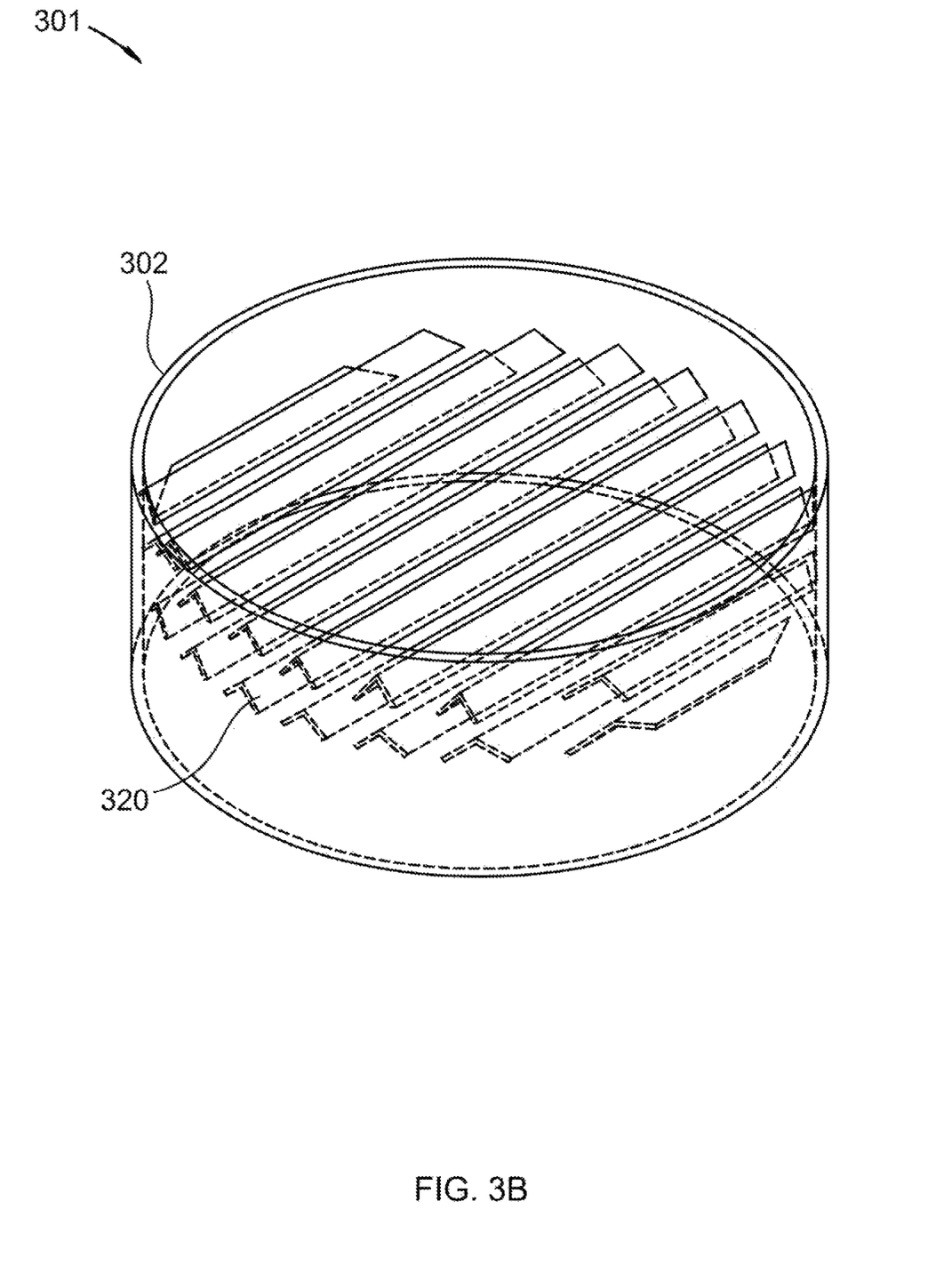

Referring to FIGS. 3A-B, a cross-section of a vessel for bubbling a gas through a liquid without fouling of a demister is shown at 300 and an isometric cutaway view of the diverter portion of the vessel is shown at 301, as per one embodiment of the present invention. Vessel 302 comprises liquid inlet 304, gas inlet 306, liquid outlet 308, gas outlet 310, demister 312, bubble plate 314, and diverter bars 320. Process fluid 330 is provided to liquid inlet 304 and combustion flue gas 332 passes through bubble plate 314 and through process fluid 330. Gas 332 is cooled and carbon dioxide is desublimated, condensed, and solidified from the gas to form carbon dioxide solid 318, leaving carbon dioxide-depleted gas 334, which passes through process fluid 330, diverter bars 320, demister 312, and out gas outlet 310. Carbon dioxide-depleted gas 334 leaving process fluid 330 causes splashing and spurting 316 of process fluid 330 and carbon dioxide solid 318. Diverter bars 320 block splashing and spurting 316 of process fluid 330 from causing carbon dioxide solid 318 to impinge upon demister 312, keeping demister 312 from fouling. In some embodiments, other components in combustion flue gas 332 are desublimated, condensed, or solidified in process fluid.

Figure 4:
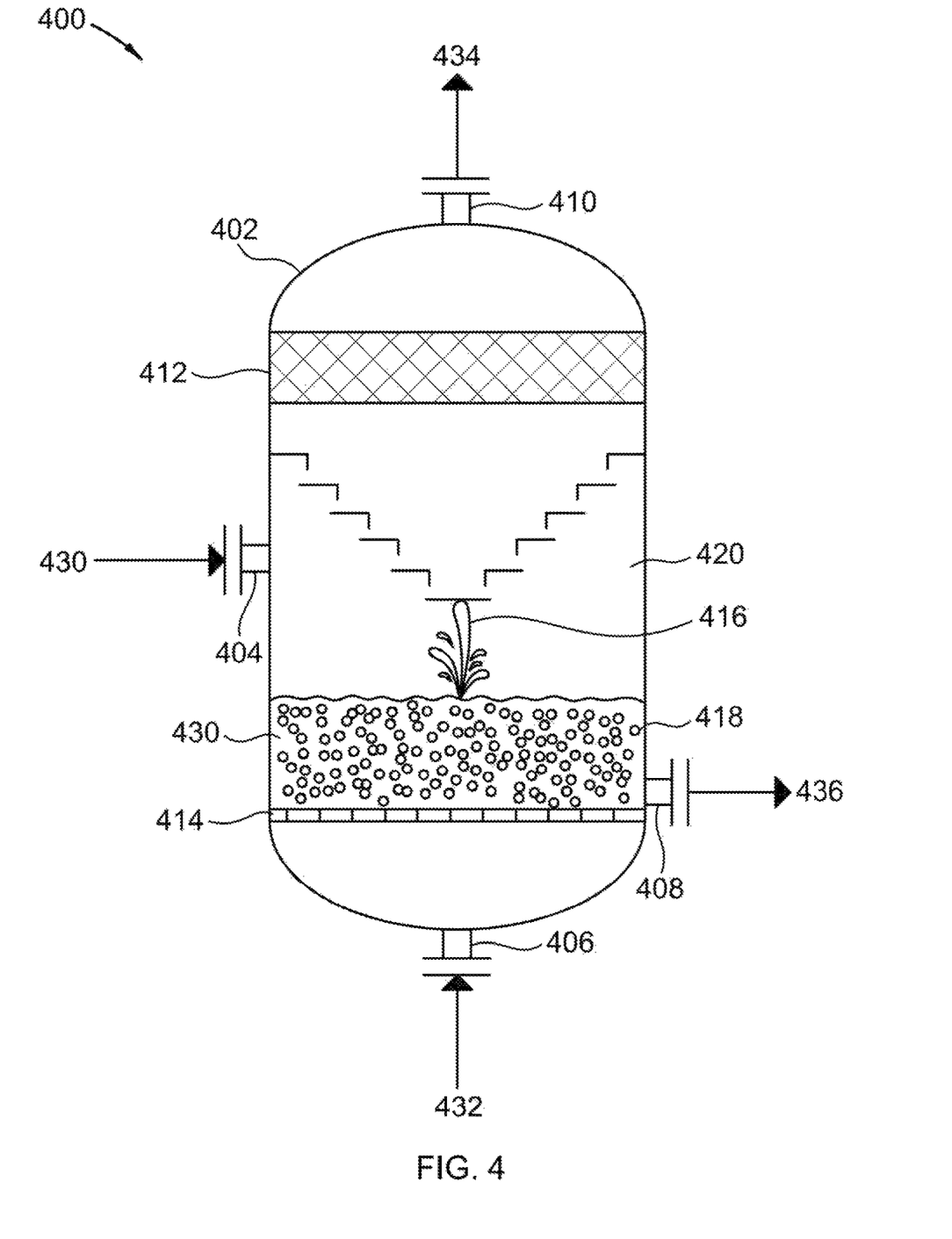
FIG. 4 shows a cross-section of a vessel for bubbling a gas through a liquid without fouling of a demister.

Referring to FIG. 4, a cross-section of a vessel for bubbling a gas through a liquid without fouling of a demister is shown at 400, as per one embodiment of the present invention. Vessel 402 comprises liquid inlet 404, gas inlet 406, liquid outlet 408, gas outlet 410, demister 412, bubble plate 414, and diverter bars 420. Process fluid 430 is provided to liquid inlet 404 and gas 432 passes through bubble plate 414 and through process fluid 430. Gas 432 is cooled and a component is desublimated, condensed, crystallized, solidified, reacted, or a combination thereof from the gas to form solid 418, leaving component-depleted gas 434, which passes through process fluid 430, diverter bars 420, demister 412, and out gas outlet 410. Component-depleted gas 434 leaving process fluid 430 causes splashing and spurting 416 of process fluid 430 and solid 418. Diverter bars 420 block splashing and spurting 416 of process fluid 330 from causing solid 418 to impinge upon demister 412, keeping demister 412 from fouling.

Figure 5A:
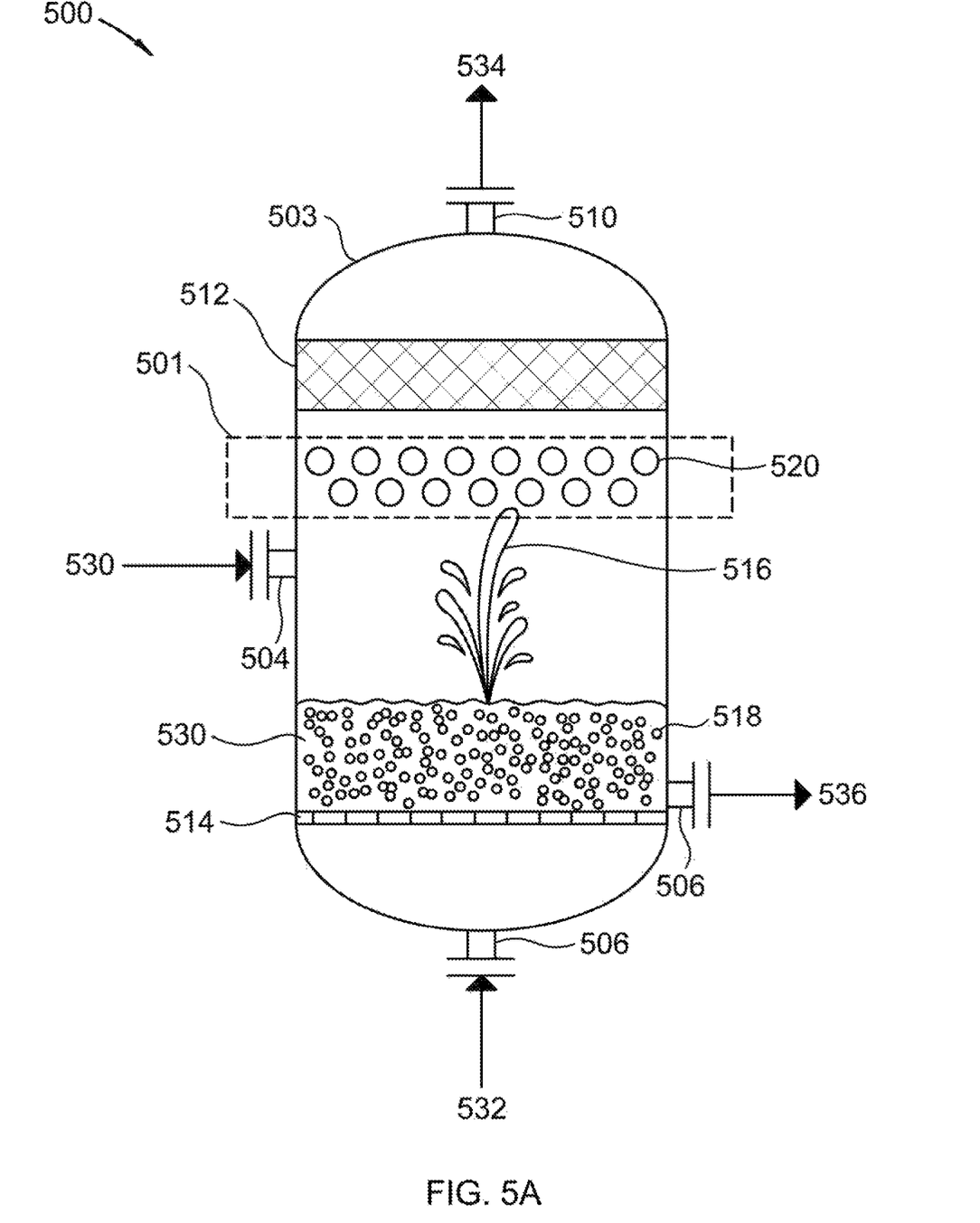
FIGS. 5A-C show a cross-section of a vessel for bubbling a gas through a liquid without fouling of a demister, an isometric cutaway view of the diverter in the vessel, and a clear isometric view of the entire vessel.
Figure 5B:
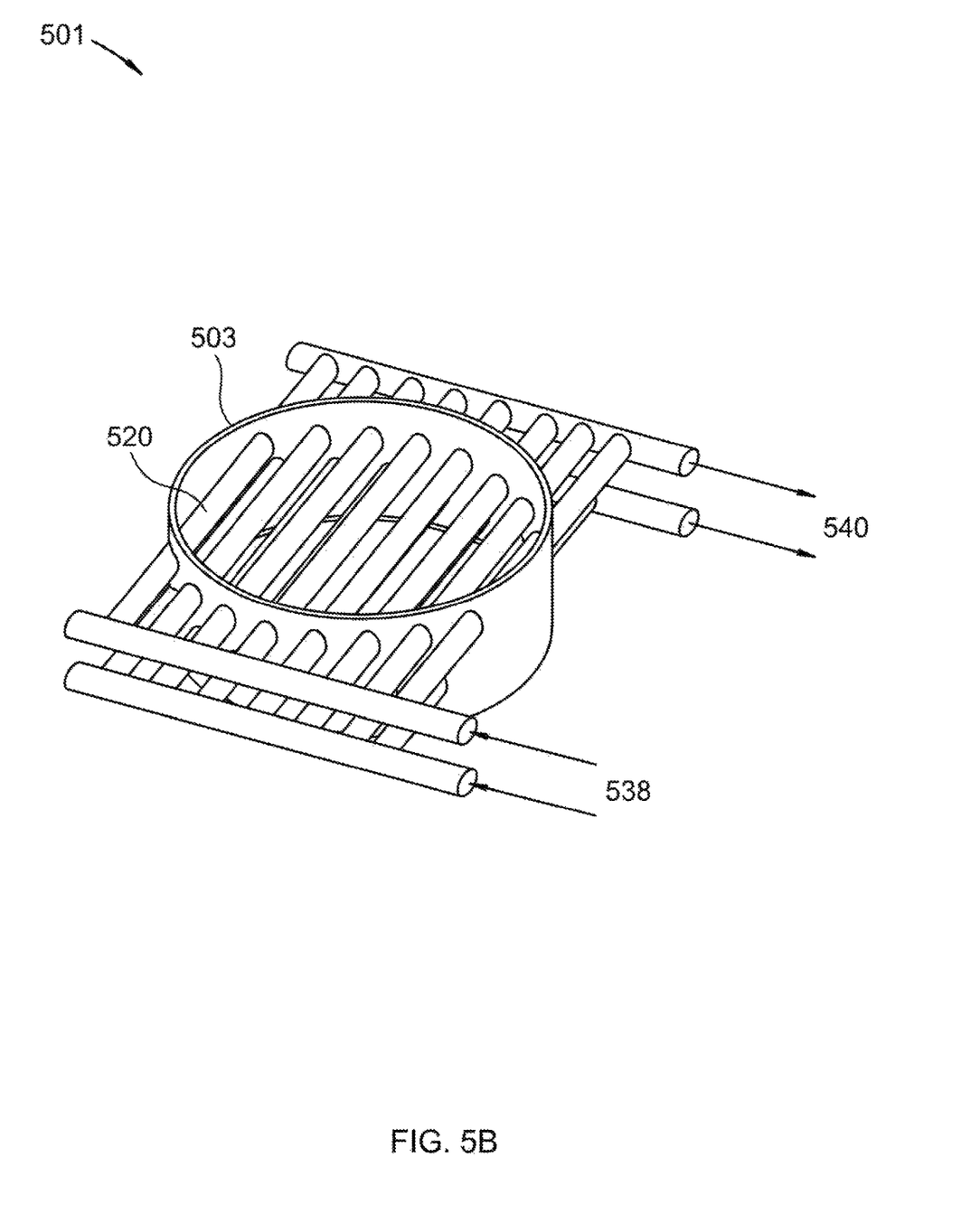
Figure 5C:
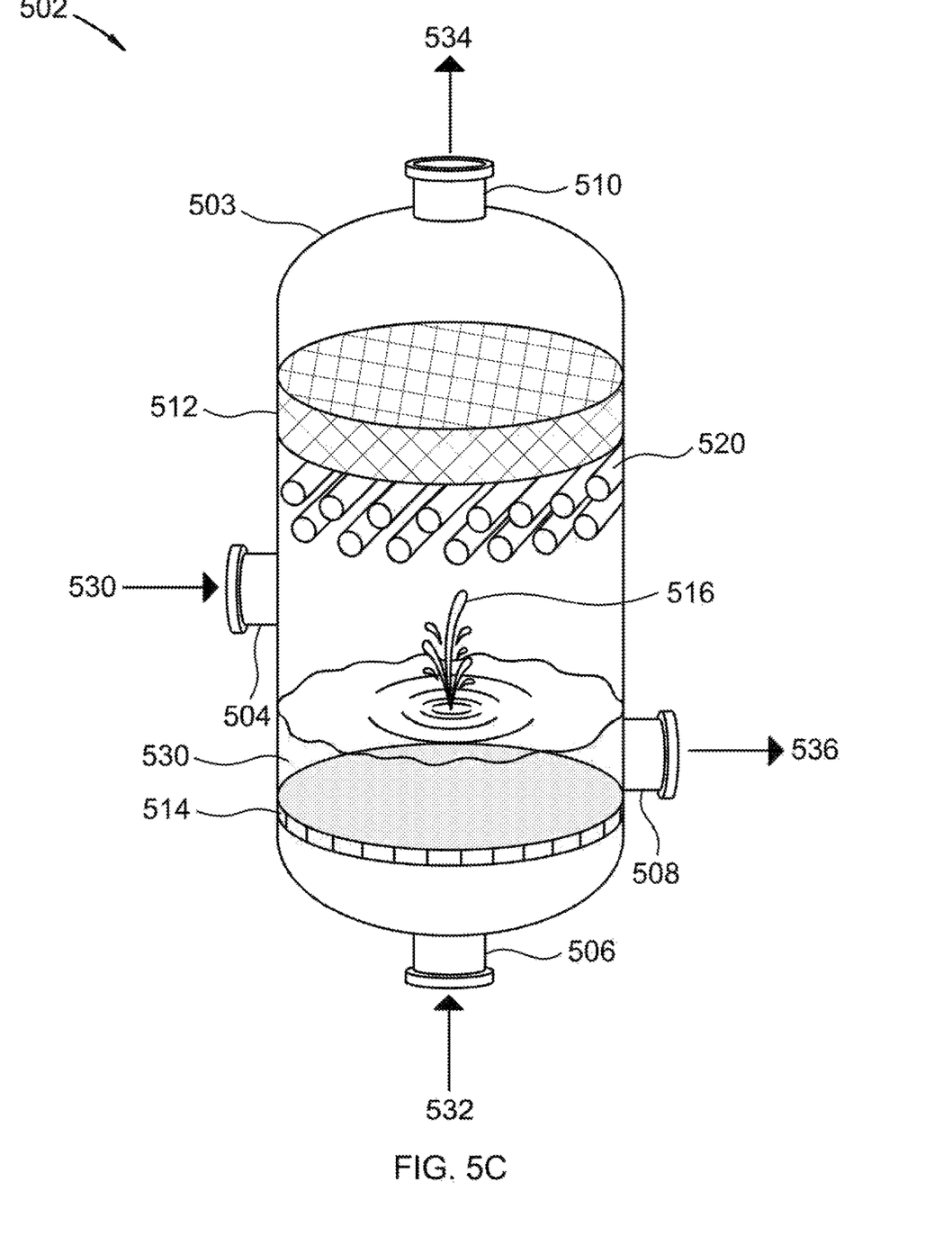

Referring to FIGS. 5A-C, a cross-section of a vessel for bubbling a gas through a liquid without fouling of a demister is shown at 500, an isometric cutaway view of the diverter in the vessel is shown at 501, and a clear isometric view of the entire vessel is shown at 502, as per one embodiment of the present invention. Vessel 502 comprises liquid inlet 504, gas inlet 506, liquid outlet 508, gas outlet 510, demister 512, bubble plate 514, and diverter bars 520. Process fluid 530 is provided to liquid inlet 504 and combustion flue gas 532 passes through bubble plate 514 and through process fluid 530. Gas 532 is cooled and carbon dioxide is desublimated, condensed, and solidified from the gas to form carbon dioxide solid 518, leaving carbon dioxide-depleted gas 534, which passes through process fluid 530, diverter bars 520, demister 512, and out gas outlet 510. Carbon dioxide-depleted gas 534 leaving process fluid 530 causes splashing and spurting 516 of process fluid 530 and carbon dioxide solid 518. Diverter bars 520 block splashing and spurting 516 of process fluid 530 from causing carbon dioxide solid 518 to impinge upon demister 512, keeping demister 512 from fouling. In some embodiments, other components in combustion flue gas 532 are desublimated, condensed, or solidified in process fluid.

Figure 6:
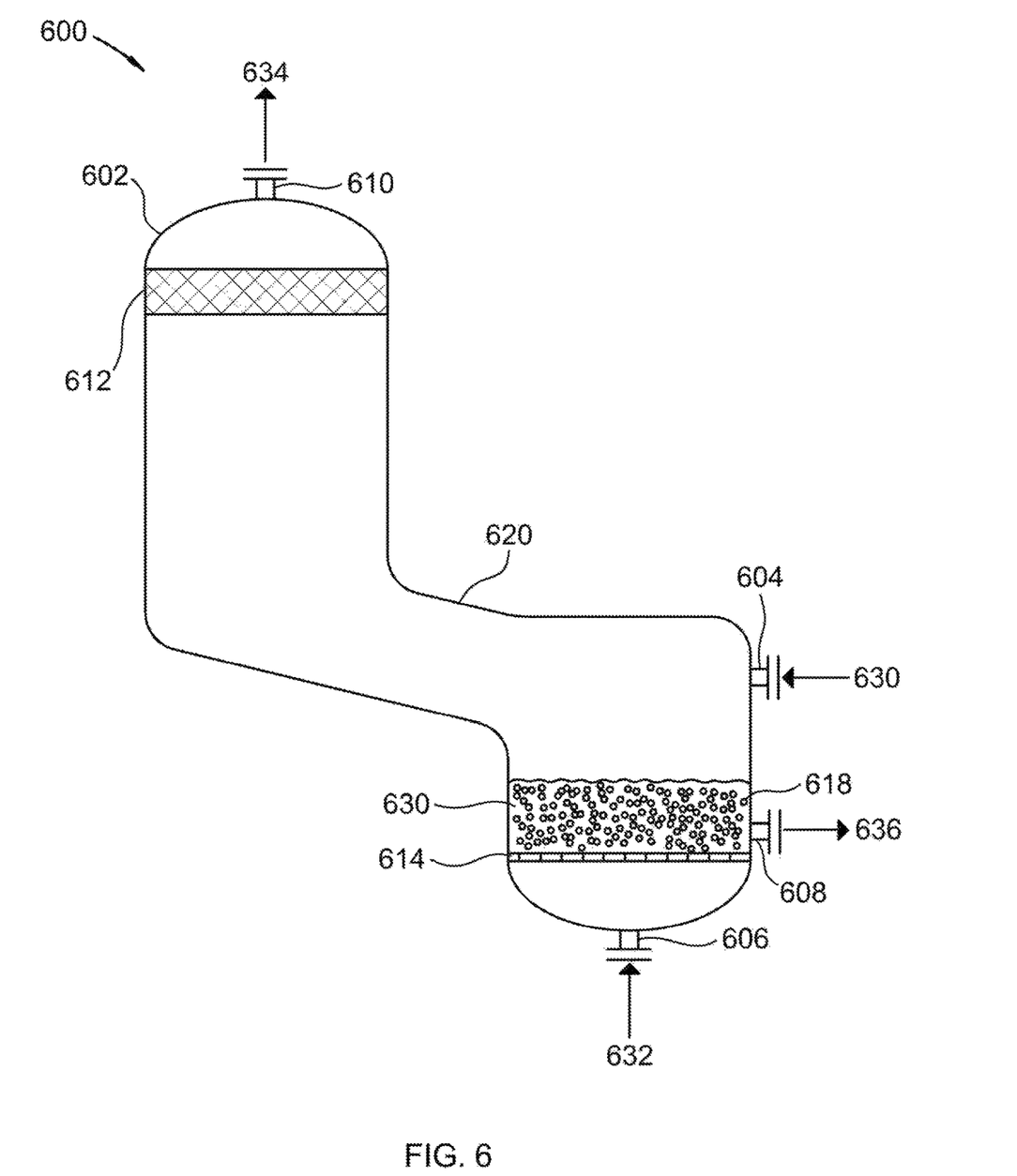
FIG. 6 shows a cross-section of a vessel for bubbling a gas through a liquid without fouling of a demister.

Referring to FIG. 6, a cross-section of a vessel for bubbling a gas through a liquid without fouling of a demister is shown at 600, as per one embodiment of the present invention. Vessel 602 comprises liquid inlet 604, gas inlet 606, liquid outlet 608, gas outlet 610, demister 612, bubble plate 614, and diverter section 620. Process fluid 630 is provided to liquid inlet 604 and gas 632 passes through bubble plate 614 and through process fluid 630. Gas 632 is cooled and a component is desublimated, condensed, crystallized, solidified, reacted, or a combination thereof from the gas to form solid 618, leaving component-depleted gas 634, which passes through process fluid 630, diverter section 620, demister 612, and out gas outlet 610. Component-depleted gas 634 leaving process fluid 630 causes splashing and spurting 616 of process fluid 630 and solid 618. Diverter section 620, consisting of offsetting a portion of vessel 602 to the side, blocks splashing and spurting 616 of process fluid 630 from causing solid 618 to impinge upon demister 612, keeping demister 612 from fouling.

Figure 7:
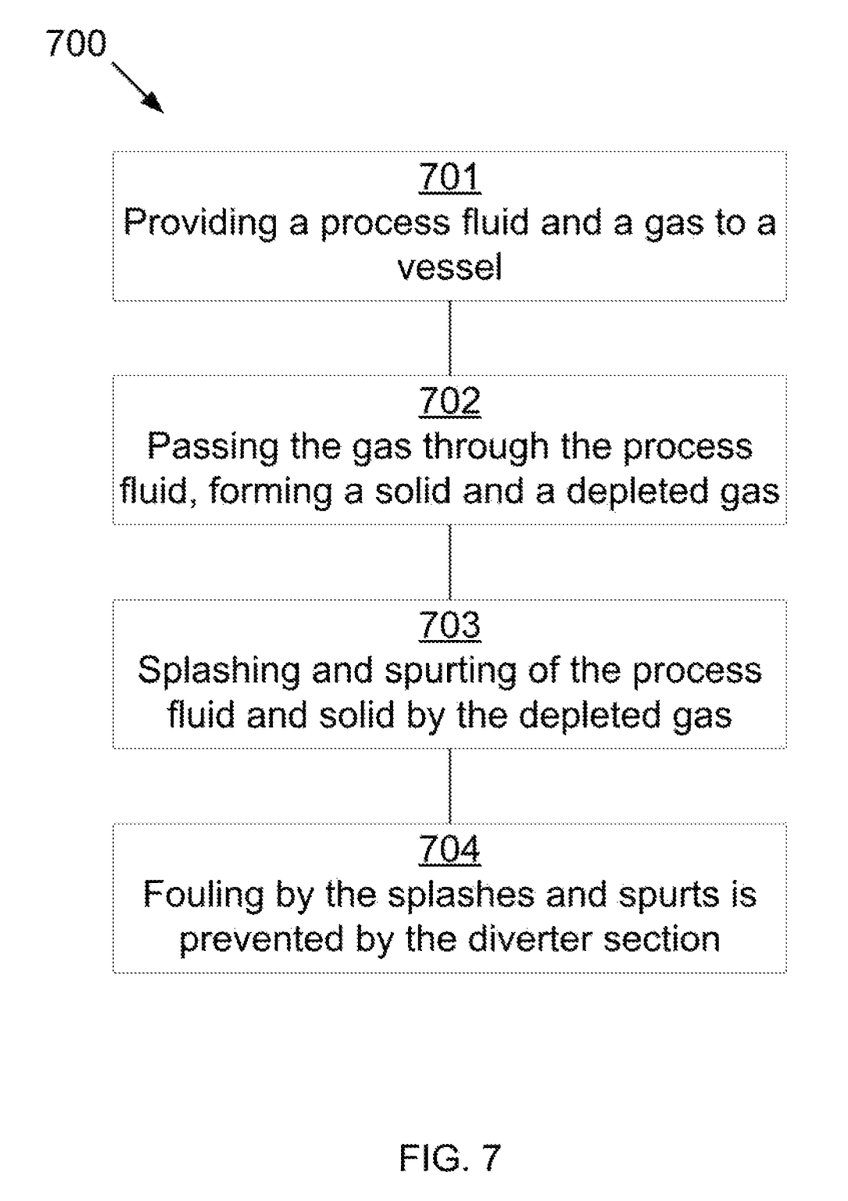
FIG. 7 shows a method for preventing fouling of a demister.

Referring to FIG. 7, a method for preventing fouling of a demister is shown at 700, as per one embodiment of the present invention. A process fluid and a gas are provided to a vessel 701. The gas is provided through a gas inlet and passes through the process fluid, forming a solid and a depleted gas 702. The depleted gas causes the process fluid to splash and spurt 703. The diverter section prevents fouling of the demister, as the splashes and spurts impinge on the diverter section and not on the demister 704.

The diverter section comprises a physical obstruction. In some embodiments, the physical obstruction allows the component-depleted gas to pass upwards and the process fluid to pass downwards. In some embodiments, the physical obstruction comprises a surface material inhibiting adsorption of gases, preventing deposition of solids, or a combination thereof. In some embodiments, the physical obstruction comprises one or more bars, rods, pipes, plates, angle iron, wires, tubes, hoses, spheroids, or combinations thereof. In some embodiments, the one or more bars, rods, pipes, plates, angle iron, wires, tubes, hoses, spheroids, or combinations thereof are arranged in one or more levels. In some embodiments, the one or more bars, rods, pipes, plates, angle iron, wires, tubes, hoses, spheroids, or combinations thereof are arranged in a pattern that blocks any linear path between a surface of the process fluid and a surface of the demister. In some embodiments, a heat exchange fluid is provided to the pipes to melt a portion of the first solid that impinges upon the pipes, causing the first solid to slide off the pipes into the process fluid. In some embodiments, the pipes are provided at an acute angle below horizontal.

In some embodiments, the physical obstruction comprises an offset section of the vessel, wherein a middle portion of the vessel jogs to a side, causing the upper portion of the vessel to not be above the process fluid. In some embodiments, the vessel comprises a direct-contact heat exchanger, direct-contact material exchanger, spray tower, reactor, combustor, distillation column, flash vessel, or tank.

In some embodiments, the gas inlet comprises a bubble plate, bubble tray, nozzle, sparger, or combinations thereof. In some embodiments, the gas inlet further comprises a surface material inhibiting adsorption of gases, preventing deposition of solids, or a combination thereof.

In some embodiments, the demister comprises a knitted-mesh demister, a vane-type demister, a demisting cyclone, a coalescer, a fiber-bed mist eliminator, or combinations thereof.

In some embodiments, the gas comprises flue gas, syngas, producer gas, natural gas, steam reforming gas, any hydrocarbon that has a lower freezing point than the temperature of the process fluid, light gases, refinery off-gases, or combinations thereof. In some embodiments, the component comprises carbon dioxide, nitrogen oxide, sulfur dioxide, nitrogen dioxide, sulfur trioxide, hydrogen sulfide, hydrogen cyanide, water, mercury, hydrocarbons with a freezing point above a temperature of the process fluid, or combinations thereof.

In some embodiments, the process fluid comprises a cryogenic liquid. In some embodiments, the cryogenic liquid comprises any compound or mixture of compounds with a freezing point above a temperature at which the first solid forms from the gas. In some embodiments, the cryogenic liquid further comprises 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the process fluid further comprises a second solid. In some embodiments, the second solid comprises particulates, mercury, other heavy metals, condensed organics, soot, inorganic ash components, biomass, salts, water ice, frozen condensable gases, frozen absorbed gases, impurities common to vitiated flows, impurities common to producer gases, impurities common to other industrial flows, or combinations thereof.

In some embodiments, the diverter section comprises plates that are cleared of solid material build-up by scrapers or vibration.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

The invention claimed is:

1. A method for preventing fouling of a demister comprising:
    providing a vessel, the vessel comprising the demister in an upper portion of the vessel, a gas inlet in a lower portion of the vessel, and a diverter section in a first middle portion of the vessel;
    providing a process fluid into a second middle portion of the vessel;
    providing a gas to the gas inlet, wherein the gas comprises a component that desublimates, condenses, crystallizes, solidifies, reacts, or a combination thereof, in the process fluid, forming a first solid;
    passing the gas through the gas inlet into the process fluid, the component of the gas forming the first solid, resulting in a component-depleted gas, wherein the component-depleted gas passing out of the process fluid causes splashing or spurting of the process fluid and the first solid; and,
    providing the diverter section between the demister and the gas inlet, the diverter section comprising a physical obstruction preventing the process fluid and the first solid from splashing or spurting onto the demister;
    whereby fouling of the demister is prevented.

2. The method of claim 1, providing the physical obstruction, the physical obstruction allowing the component-depleted gas to pass upwards and the process fluid to pass downwards.

3. The method of claim 2, providing the physical obstruction comprising a surface material inhibiting adsorption of gases, preventing deposition of solids, or a combination thereof.

4. The method of claim 2, providing the physical obstruction comprising one or more bars, rods, pipes, plates, angle iron, wires, tubes, hoses, spheroids, or combinations thereof.

5. The method of claim 4, arranging the one or more bars, rods, pipes, plates, angle iron, wires, tubes, hoses, spheroids, or combinations thereof in one or more levels.

6. The method of claim 5, arranging the one or more bars, rods, pipes, plates, angle iron, wires, tubes, hoses, spheroids, or combinations thereof in a pattern that blocks any linear path between a surface of the process fluid and a surface of the demister.

7. The method of claim 4, further comprising providing a heat exchange fluid to the pipes to melt a portion of the first solid that impinges upon the pipes, causing the first solid to slide off the pipes into the process fluid.

8. The method of claim 7, providing the pipes at an acute angle below horizontal.

9. The method of claim 1, providing the physical obstruction comprising an offset section of the vessel, wherein a middle portion of the vessel jogs to a side, causing the upper portion of the vessel to not be above the process fluid.

10. The method of claim 1, providing the vessel comprising a direct-contact heat exchanger, direct-contact material exchanger, spray tower, reactor, combustor, distillation column, flash vessel, or tank.

11. The method of claim 1, providing the gas inlet comprising a bubble plate, bubble tray, nozzle, sparger, or combinations thereof.

12. The method of claim 11, providing the gas inlet further comprising a surface material inhibiting adsorption of gases, preventing deposition of solids, or a combination thereof.

13. The method of claim 1, providing the demister comprising a knitted-mesh demister, a vane-type demister, a demisting cyclone, a coalescer, a fiber-bed mist eliminator, or combinations thereof.

14. The method of claim 1, providing the gas comprising flue gas, syngas, producer gas, natural gas, steam reforming gas, any hydrocarbon that has a lower freezing point than the temperature of the process fluid, light gases, refinery off-gases, or combinations thereof.

15. The method of claim 14, providing the component comprising carbon dioxide, nitrogen oxide, sulfur dioxide, nitrogen dioxide, sulfur trioxide, hydrogen sulfide, hydrogen cyanide, water, mercury, hydrocarbons with a freezing point above a temperature of the process fluid, or combinations thereof.

16. The method of claim 1, providing the process fluid comprising a cryogenic liquid.

17. The method of claim 16, providing the cryogenic liquid comprising any compound or mixture of compounds with a freezing point above a temperature at which the first solid forms from the gas.

18. The method of claim 17, providing the cryogenic liquid further comprising 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

19. The method of claim 16, providing the process fluid further comprising a second solid.

20. The method of claim 19, providing the second solid comprising particulates, mercury, other heavy metals, condensed organics, soot, inorganic ash components, biomass, salts, water ice, frozen condensable gases, frozen absorbed gases, impurities common to vitiated flows, impurities common to producer gases, impurities common to other industrial flows, or combinations thereof.

* * * * *